(12) United States Patent
Hunt

(10) Patent No.: US 6,802,552 B2
(45) Date of Patent: Oct. 12, 2004

(54) VEHICLE END GATE ASSEMBLY

(75) Inventor: Robert M. Hunt, Bingham Farms, MI (US)

(73) Assignee: General Motors Corporation, Detroit, MI (US)

( * ) Notice: Subject to any disclaimer, the term of this patent is extended or adjusted under 35 U.S.C. 154(b) by 87 days.

(21) Appl. No.: 10/321,923

(22) Filed: Dec. 17, 2002

(65) Prior Publication Data

US 2004/0113449 A1 Jun. 17, 2004

(51) Int. Cl.$^7$ ............................................... B62D 33/03
(52) U.S. Cl. ........................................ 296/57.1; 296/61
(58) Field of Search .......................... 296/57.1, 51, 50, 296/61, 62

(56) References Cited

U.S. PATENT DOCUMENTS

| | | | | |
|---|---|---|---|---|
| 3,510,015 A | * | 5/1970 | Roshaven | 296/61 |
| 3,756,440 A | * | 9/1973 | Raap et al. | 296/61 |
| 5,478,034 A | * | 12/1995 | Cunningham et al. | 248/118.5 |
| 5,536,058 A | * | 7/1996 | Otis | 296/61 |
| 5,598,595 A | * | 2/1997 | Flinchum | 296/61 |
| 5,769,593 A | * | 6/1998 | Buffaloe | 296/57.1 |
| 5,813,714 A | * | 9/1998 | Lipinski et al. | 296/61 |
| 5,971,465 A | * | 10/1999 | Ives et al. | 296/61 |
| 6,149,219 A | * | 11/2000 | Schambre et al. | 296/57.1 |
| 6,158,798 A | * | 12/2000 | Stedtfeld et al. | 296/61 |
| 6,527,326 B2 | * | 3/2003 | Henderson | 296/61 |
| 2002/0145300 A1 | * | 10/2002 | Webber | 296/61 |
| 2003/0071476 A1 | * | 4/2003 | Schilling | 296/61 |

* cited by examiner

Primary Examiner—Lori L Coletta
(74) Attorney, Agent, or Firm—Laura C. Hargitt

(57) ABSTRACT

A vehicle end gate assembly is adapted to be attached to a vehicle body and includes an end gate body having an interior surface extending between an upper edge and a lower edge. The lower edge of the end gate body is adapted to be hingedly attached to the vehicle body and the interior surface includes at least one recess formed therein at the upper edge. An attachment member is positioned in the at least one recess and is attached to the end gate body for releasably securing items to the end gate body.

14 Claims, 6 Drawing Sheets

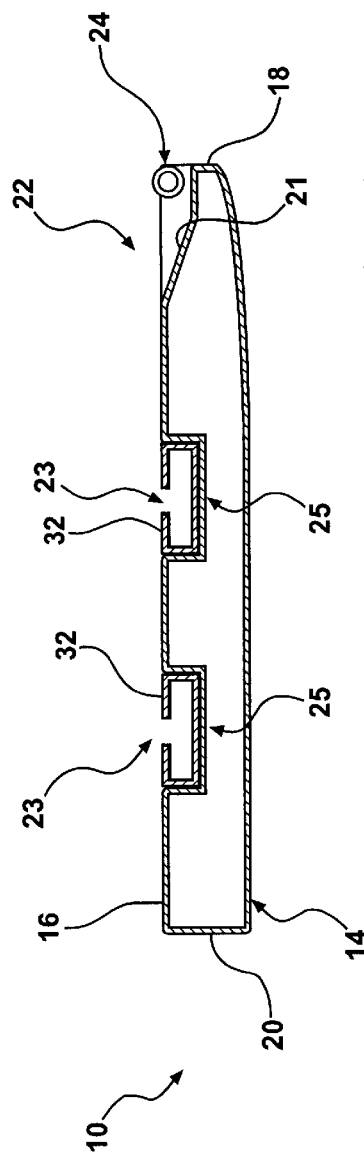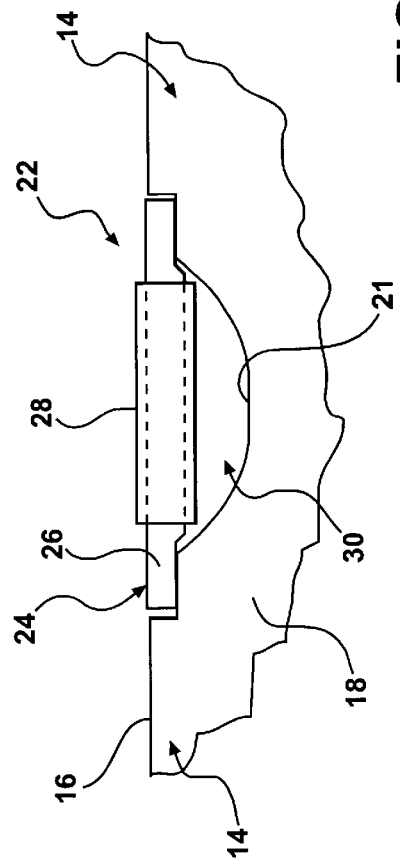

VEHICLE END GATE ASSEMBLY

BACKGROUND OF THE INVENTION

The present invention relates generally to vehicle doors and end gates and, in particular, to a vehicle end gate assembly for attachment to a vehicle body.

Vehicle end gates are well known. The traditional prior art vehicle end gate is a door extending across the width of the vehicle and hinged at a bottom edge thereof, which can be latched to the sides of the vehicle storage area, such as a pickup box or a vehicle interior, in a vertical position. The end gate is operable to be unlatched to swing from the vertical position to a horizontal position that is approximately coplanar with the interior loading surface of the vehicle storage area to facilitate the loading of cargo into the pickup box or vehicle interior, or to support cargo that is longer than the pickup box or vehicle interior.

Often the items or cargo that are loaded into the pickup box or vehicle interior are heavy or awkward to maneuver into the pickup box or vehicle interior. Traditional prior art end gates do not provide any assistance to the person attempting to maneuver the heavy or awkward items into the vehicle storage area. In addition, prior art end gates, when unlatched in the deployed position, do not provide many areas for releasably securing the items or cargo with rope, bungee cords or the like.

It is desirable, therefore, to provide a vehicle end gate assembly that provides assistance to persons attempting to maneuver cargo or items into the vehicle storage area and to provide a vehicle end gate assembly having a plurality of locations for releasably securing the cargo or items thereto. It is also desirable to increase the functionality of the vehicle end gate assembly in a cost-effective manner.

SUMMARY OF THE INVENTION

The present invention concerns a vehicle end gate assembly for attachment to a vehicle body. The assembly includes an end gate body having an interior surface extending between an upper edge and a lower edge. The lower edge of the end gate body is adapted to be hingedly attached to the vehicle body and the interior surface includes at least one recess formed therein at the upper edge. An attachment member is positioned in the at least one recess and is attached to the end gate body for releasably securing items to the end gate body.

Alternatively, the end gate assembly includes a plurality of recesses and a plurality of attachment members each positioned in an associated one of the recesses and attached to the end gate body for releasably securing items to the end gate body.

The interior surface of the vehicle end gate assembly is preferably smooth to allow items or cargo to slide across the interior surface when loading and unloading the items or cargo. The recesses are preferably a plurality of identical scallop-shaped pockets that are formed in the top front edge of the interior surface of the end gate body. Preferably three, four, or five recesses are spaced across the width of the upper edge of the end gate body.

The attachment members are preferably a rod or the like that spans the width of the recess or recesses and defines a gap between the attachment member and the interior surface for releasably securing items to the end gate body, such as with rope or the like. The attachment members are preferably mounted flush with the plane of the interior surface of the end gate body. The attachment member may be enclosed with a roller member, such as a tube that rolls on the handle. These tubes act as rollers to facilitate the loading of the items or cargo over the end of the end gate body. The attachment members may be used as tiedown points to secure cargo, or, for example, could be used as points to which loading ramps could be attached securely.

Alternatively, the attachment members are C-shaped members that are mounted in a recess intermediate the upper edge and lower edge of the end gate body, so that the attachment member does not project above the smooth interior surface of the end gate body. Any number of accessories can be constructed that are adapted to be secured to the interior surface of the end gate body by a combination of tabs which hook under the attachment members and lock into the C-shaped attachment member, such as a workbench used with the end gate body open, a toolbox, a bag holder, or various basket and racks. Alternatively, the attachment members are a rail or any other similar attachment system that is adapted to be positioned in the recess and allow for releasably securing items thereto.

The versatile vehicle end gate assembly according to the present invention can be equipped with a number of features that inexpensively enhance the functionality of the conventional prior art end gate assembly. By easing cargo loading, providing tiedown points that help secure cargo with the end gate body down and making provision for useful accessories, the value of the vehicle to the customer is enhanced at very little cost. The features are simple to understand and use.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a cross-sectional view taken along line 2—2 of the vehicle end gate assembly in FIG. 1;

FIG. 3 is a fragmentary end view of an attachment member of the vehicle end gate assembly in FIG. 1;

DESCRIPTION OF THE PREFERRED EMBODIMENT

Figure 1:
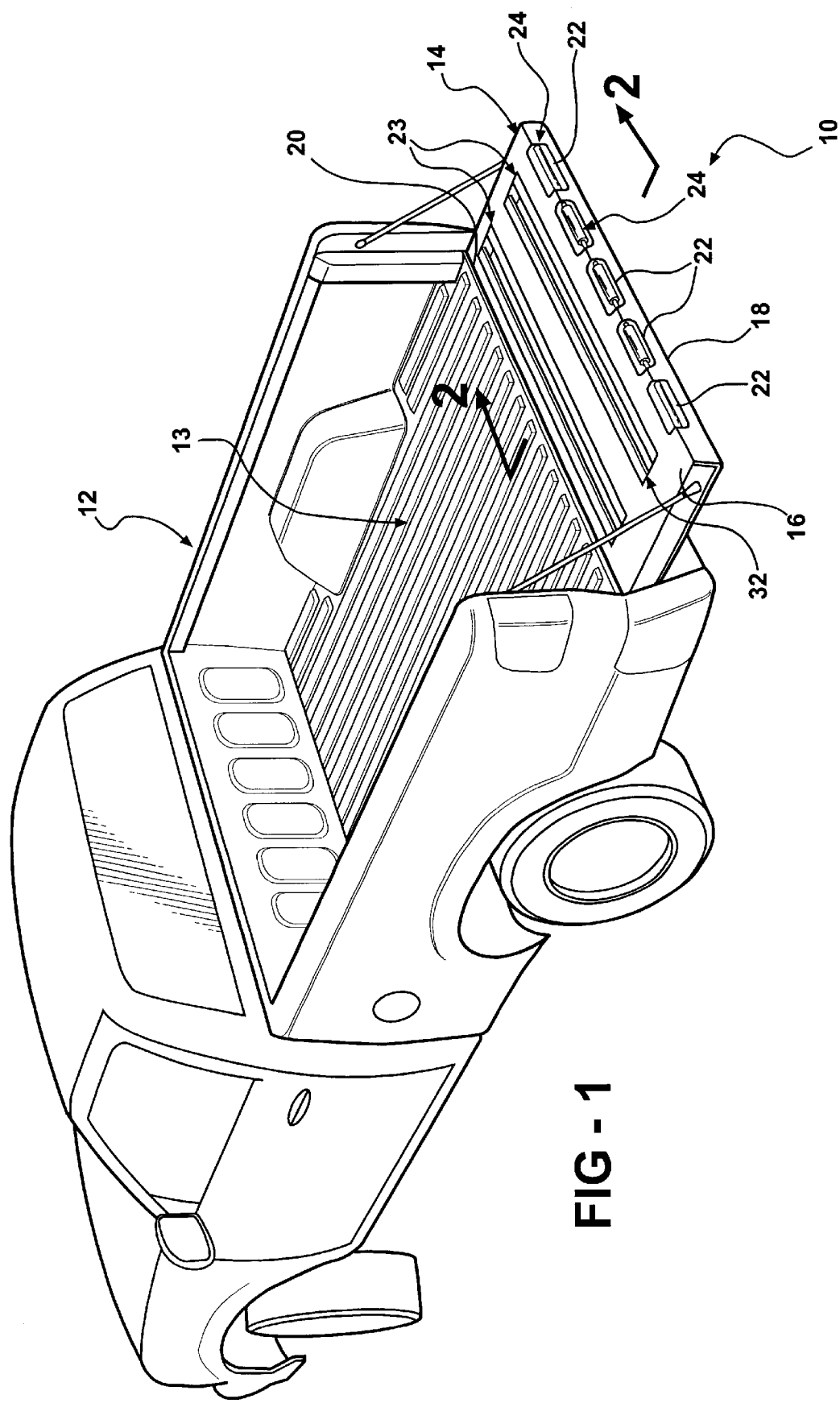
FIG. 1 is a perspective view of a vehicle end gate assembly in accordance with the present invention shown attached to a vehicle body in a horizontal, unlatched position.
Figure 4:
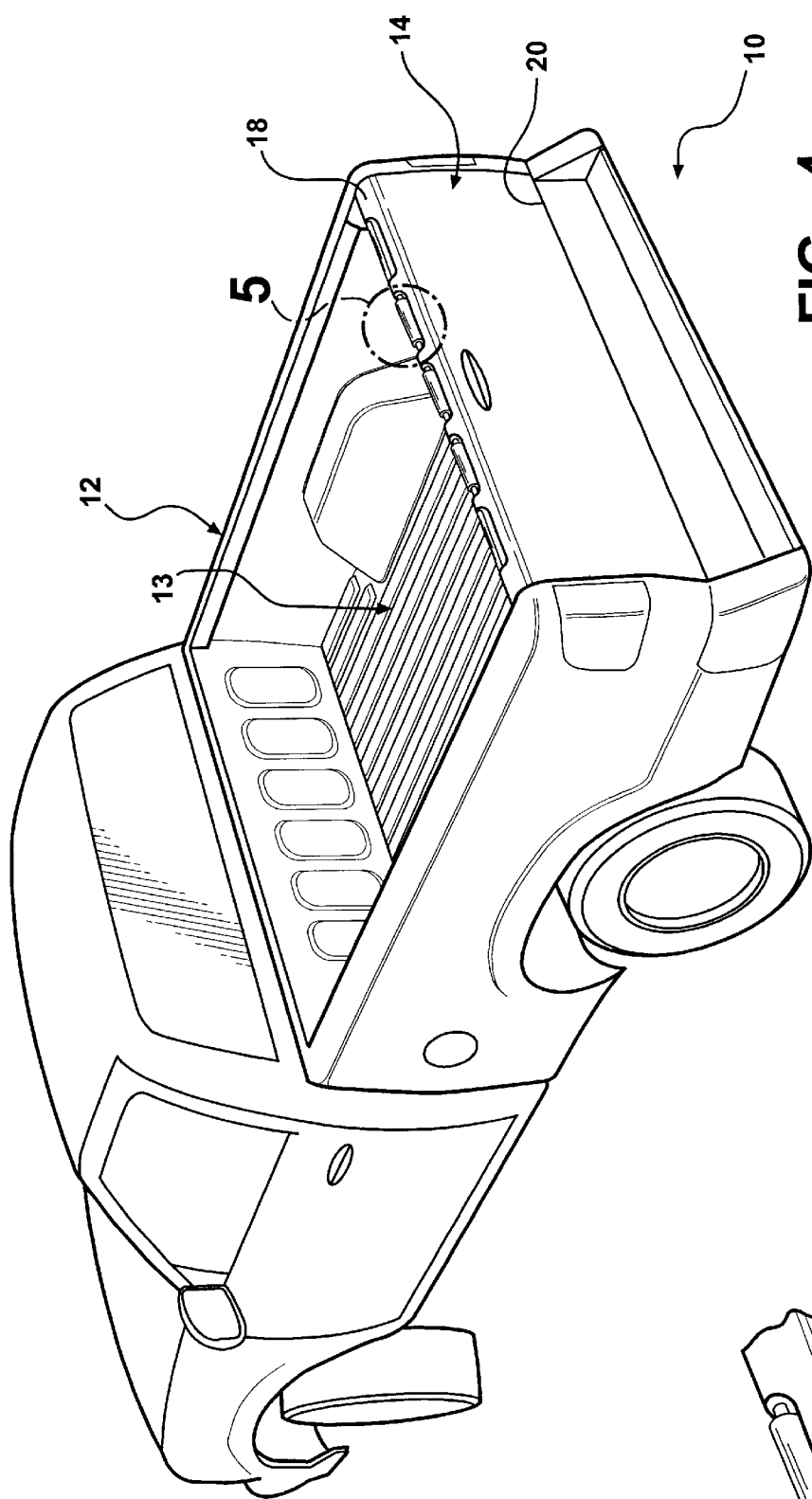
FIG. 4 is a perspective view of a vehicle end gate assembly in accordance with the present invention shown attached to a vehicle in a vertical, latched position.
Figure 5:
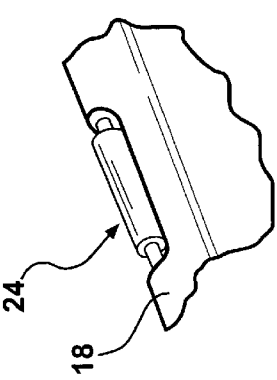
FIG. 5 is an enlarged view of the encircled area 5 of FIG. 4.

Referring now to FIGS. 1–5, a vehicle end gate assembly in accordance with the present invention is indicated generally at 10. The assembly 10 is adapted to be attached to a vehicle body 12, such as a pickup truck or the like having an interior loading surface 13. The assembly 10 includes an end gate body 14 having an interior surface 16 extending between an upper edge 18 and a lower edge 20. The lower edge 20 is adapted to be hingedly attached to the vehicle body 12. Preferably, the interior surface 16 is coplanar with the loading surface 13. The interior loading surface 16 of the end gate body 14 is smooth to allow items or cargo to slide across the interior surface 16 when loading and unloading the items or cargo, discussed in more detail below. The interior surface 16 includes a plurality of recesses 22 formed therein at the upper edge 18. The generally scallop-shaped recesses 22 define a recessed surface 21 in the interior surface 16. Preferably three, four, or five recesses 22 are spaced across the width of the upper edge 18 of the end gate body 14. The interior surface 16 also includes a plurality of recesses 23 formed therein intermediate the upper edge 18 and the lower edge 20. The generally rectangular-shaped recesses 23 define a recessed surface 25 in the interior surface 16.

A first attachment member 24 is positioned in each of the recesses 22 and is attached to opposed edges of the recessed surface 21 for releasably securing items to the end gate body 14. An upper surface of each of the first attachment member 24 is mounted flush with the plane of the interior surface 16 of the end gate body 14. The first attachment member 24 includes a generally cylindrical rod member or portion 26 having a roller member or portion 28 slidably attached thereto, best seen in FIG. 3. The first attachment member 24 extends across opposing ends of the recessed surface 21. The rod portion 26 is preferably formed of steel or similar material capable of withstanding compression or tension loads applied thereto without deforming. The roller portion 28 is preferably formed of a plastic material or similar material that will not deform the rod portion 26 when the roller portion 28 and rod portion 26 come into contact. The roller portion 28 rotatably receives the rod portion 26 or the roller portion 28 may slidably receive the rod portion 26 such as by a bearing connection (not shown) or similar connection. The first attachment member 24, when attached to the recessed surface 21, defines a gap 30 between the recessed surface 21 and an outer surface of the roller portion 28, best seen in FIG. 3. The gap 30 allows a rope, strap, bungee cord, or the like to pass therethrough or to be attached directly to the first attachment member 24, allowing items to be releasably secured to the first attachment member 24. The roller portion 28 of the first attachment member 24 is operable to provide a surface to allow an item (not shown) to slide more easily into the interior loading surface 13 when the end gate assembly 10 is in the horizontal, unlatched position of FIG. 1.

A generally C-shaped second attachment member 32 is positioned in each of the recesses 23 and each member 32 cooperates with an associated one of the recessed surfaces 25, best seen in FIG. 2. The second attachment member 32 is mounted in the recess 23 so that the second attachment member 32 does not project above the smooth interior surface 16 of the end gate body 14. The second attachment member 32 is preferably formed of steel or similar material capable of withstanding compression or tension loads applied thereto without deforming. The second attachment member 32 is adapted to receive a generally T-shaped mounting flange (not shown) extending from the item for releasably attaching the item to the end gate assembly 10. Alternatively, the second attachment member 32 receives any type of connector or mounting means that will cooperate with an interior surface of the second attachment member 32 to releasably attach an item thereto. The attachment members 24 and 32 are also adapted to allow items to be releasably attached to the end gate assembly 10 when the end gate assembly 10 is in the vertical, latched position of FIG. 5.

Figure 6:
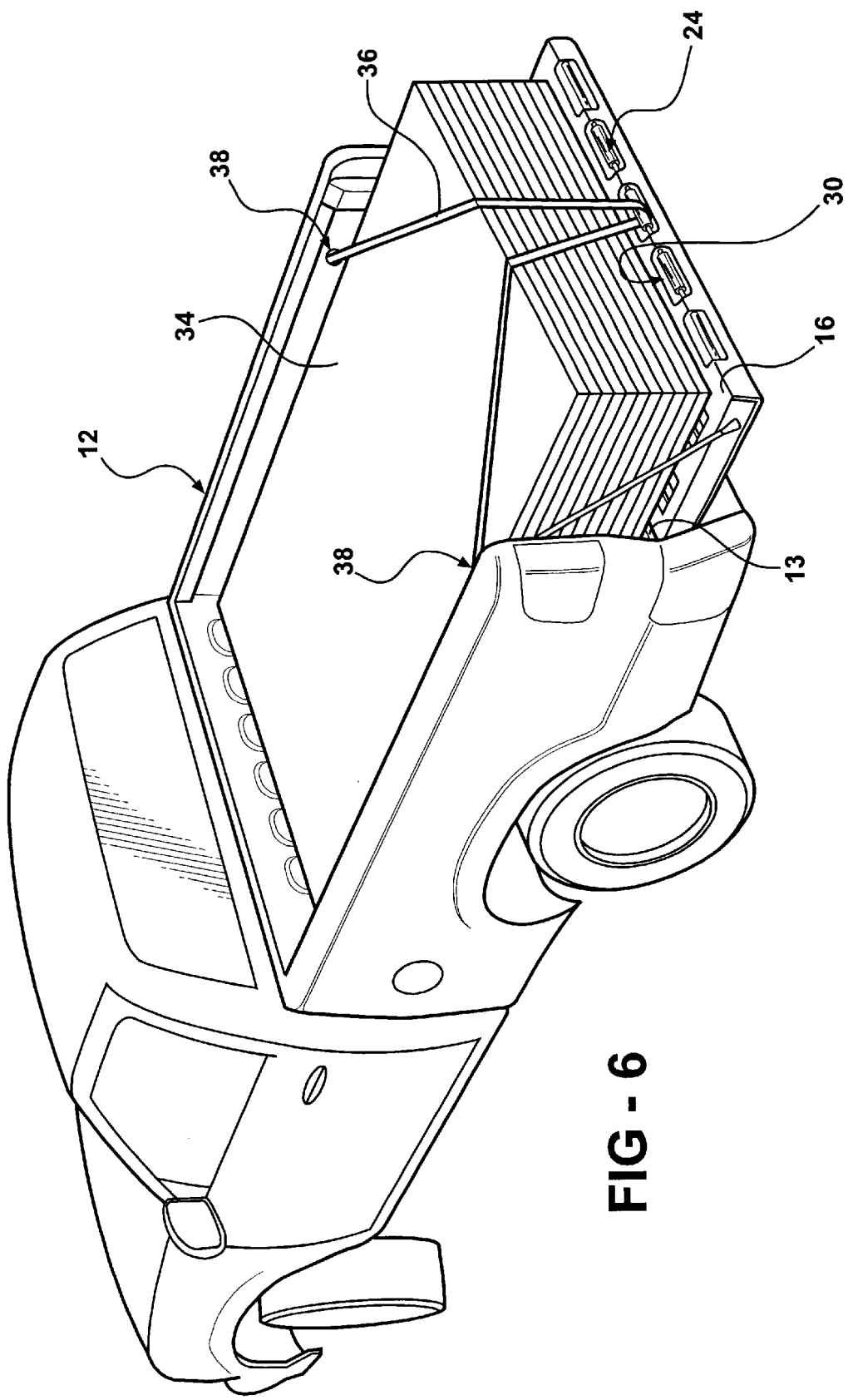
FIGS. 6–8 are perspective views of the vehicle end gate assembly in FIG. 1 shown with various items releasably attached thereto.
Figure 7:
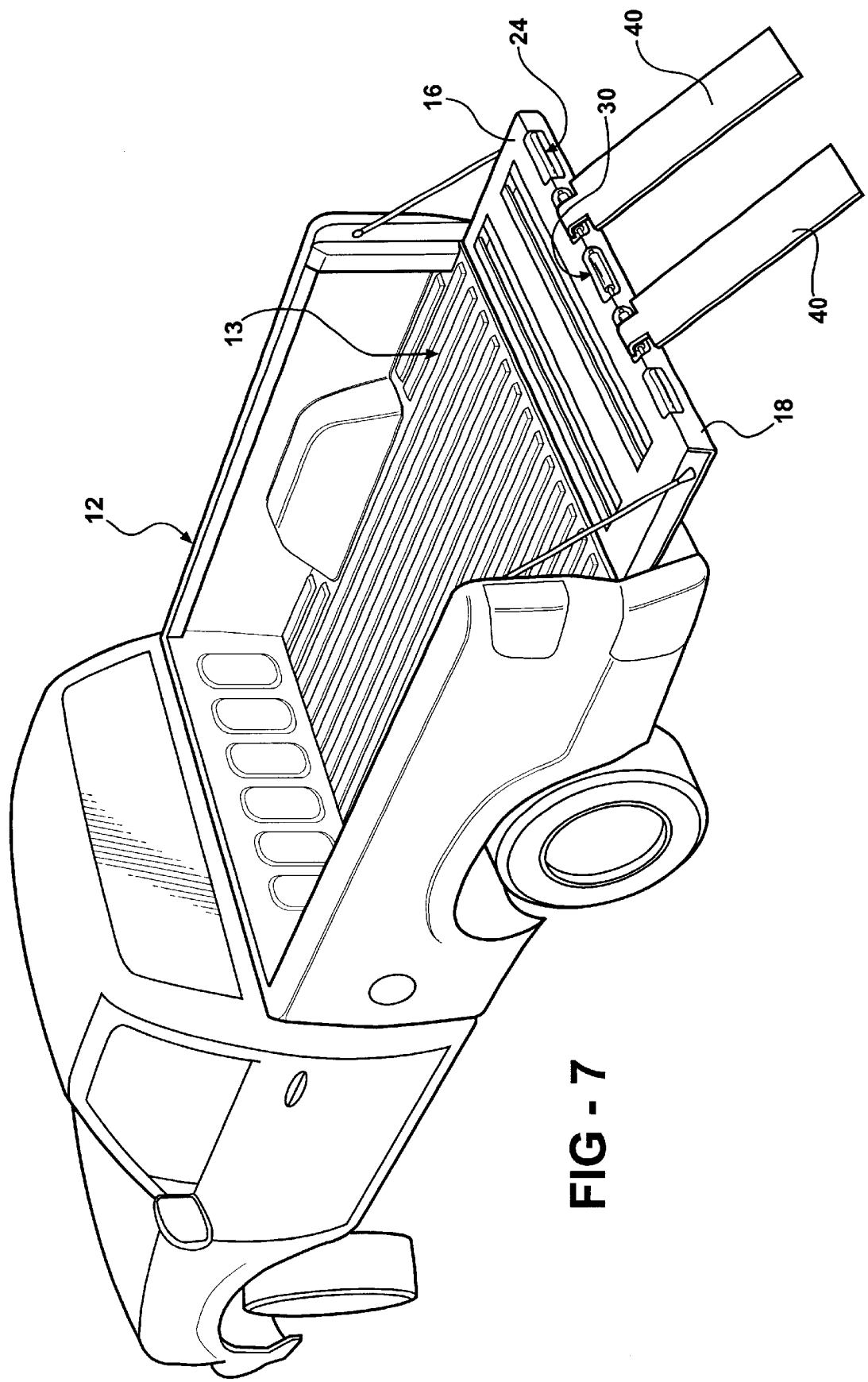
Figure 8:
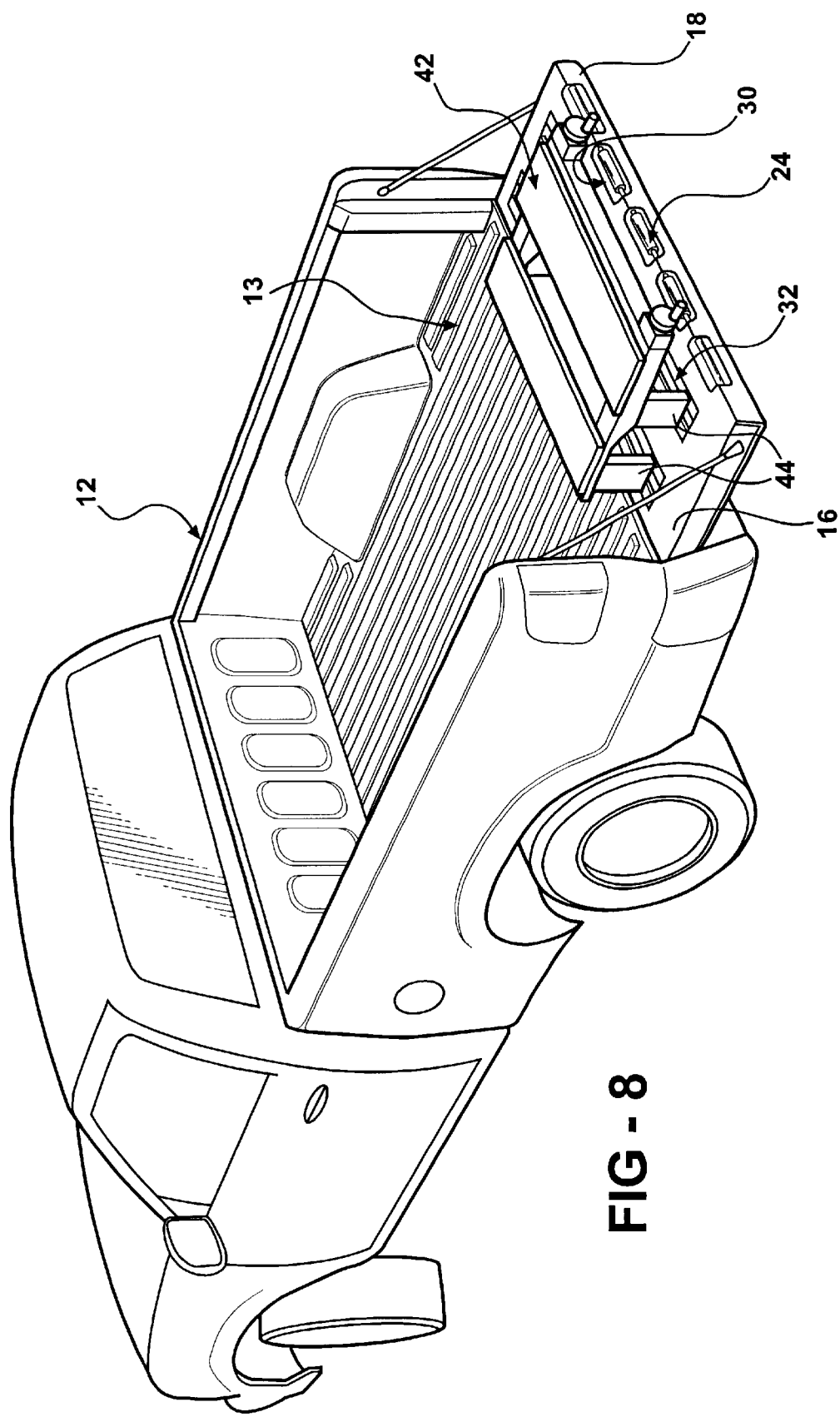

Referring now to FIGS. 6, 7, and 8, the vehicle end gate assembly 10 is shown in the horizontal, unlatched position and having a number of different items, discussed in more detail below, releasably attached thereto. In FIG. 6, a number of stacked items 34, such as plywood sheets, drywall sheets, house doors, or the like are placed flat on the vehicle interior loading surface 13. The stacked items 34 are secured by a rope, bungee cord, or strap 36 that attaches at opposing ends to a vehicle attachment point 38 provided on each inside wall of the vehicle body 12. Intermediate the vehicle attachment points 38, the strap 36 is passed through the gap 30 of one of the first attachment members 24 in order to releasably attach the items 34 to the end gate assembly 10. In FIG. 7, a loading ramp 40 is shown attached to two of the first attachment members 24. The loading ramps 40 include a mounting projection (not shown) that extends downwardly from an upper portion of each loading ramp 40 to releasably attach the ramps 40 to the first attachment members 24 and to prevent the ramps 40 from disengaging from the first attachment members 24 as a wheeled item (not shown), such as an all-terrain vehicle, a lawn mower, or the like is rolled into or out of the interior loading surface 13. Alternatively, the ramps 40 are used for sliding larger, heavier items into the interior loading surface 13. In FIG. 8, a work bench 42 is shown attached to the second attachment members 32. The work bench 42 has a plurality of legs 44 that each include a mounting flange (not shown) for cooperating with an interior surface of the second attachment members 32 for releasably attaching the work bench 42 to the end gate assembly 10.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the vehicle end gate assembly 10 has been described wherein the first attachment members 24 are attached adjacent the upper edge 18, those skilled in the art will realize that the first attachment members 24 and second attachment members 32 can be positioned in many locations along the inner surface 16 between the upper edge 18 and the lower edge 20 while remaining within the scope of the present invention. In addition, the first attachment members 24 and second attachment members 32 can utilize any shape that can be adapted to secure an item to the end gate assembly 10.

What is claimed is:

1. A vehicle end gate assembly for attachment to a rear portion of a vehicle body comprising:
    an end gate body having an interior surface extending between an upper edge and a lower edge, said lower edge adapted to be hingedly attached to the vehicle body, said interior surface having a plurality of first recesses formed therein at said upper edge, said interior surface having a plurality of second recesses formed therein intermediate said upper edge and said lower edge; and
    a plurality of first attachment members each positioned in an associated one of the first recesses and a plurality of second attachment members each positioned in an associated one of the second recesses, said first and second attachment members being attached to said end gate body for releasably securing items to said end gate body.

2. The assembly according to claim 1 wherein each said first attachment member is a rod member extending across the associated first recess.

3. The assembly according to claim 2 including a roller member rotatably attached to each said rod member.

4. The assembly according to claim 3 herein said roller member is slidably attached to each said rod member.

5. The assembly according to claim 1 wherein said second attachment member is a generally C-shaped member positioned in the associated second recess.

6. A vehicle end gate assembly for attachment to a rear portion of a vehicle body comprising:

an end gate body having an interior surface extending between an upper edge and a lower edge, said lower edge adapted to be hingedly attached to the vehicle body, at least one recess formed at said upper edge and open to said upper edge and said interior surface; and an attachment member positioned in said at least one recess and being attached to said end gate body for releasably securing items to said end gate body.

7. The assembly according to claim 6 wherein said attachment member is a rod member extending across said at least one recess.

8. The assembly according to claim 7 including a roller member rotatably attached to said rod member.

9. The assembly according to claim 8 wherein said roller member is slidably attached to said rod member.

10. The assembly according to claim 6 including at least another recess formed in said interior surface intermediate said upper edge and said lower edge and another attachment member being positioned in said at least another recess and being attached to said end gate body for releasably securing items to said end gate body.

11. The assembly according to claim 10 wherein said another attachment member is a generally C-shaped member.

12. A vehicle end gate assembly for attachment to a vehicle body comprising:

an end gate body having an interior surface extending between an upper edge and a lower edge, said lower edge adapted to be hingedly attached to the vehicle body, said interior surface having at least one recess formed therein; and an attachment member positioned in said at least one recess and attached to said end gate body for releasably securing items to said end gate body said attachment member being generally C-shaped and open at said interior surface;

at least another recess formed in said interior surface and having another attachment member positioned therein;

wherein said another attachment member is a rod member extending across said at least another recess.

13. The assembly according to claim 12 including a roller member rotatably attached to said rod member.

14. The assembly according to claim 12 wherein said roller member is slidably attached to said rod member.

* * * * *